Dec. 4, 1951 C. M. BROWNE 2,577,306
APPARATUS FOR UNITING METAL TO GLASS
Filed July 22, 1947 5 Sheets-Sheet 1
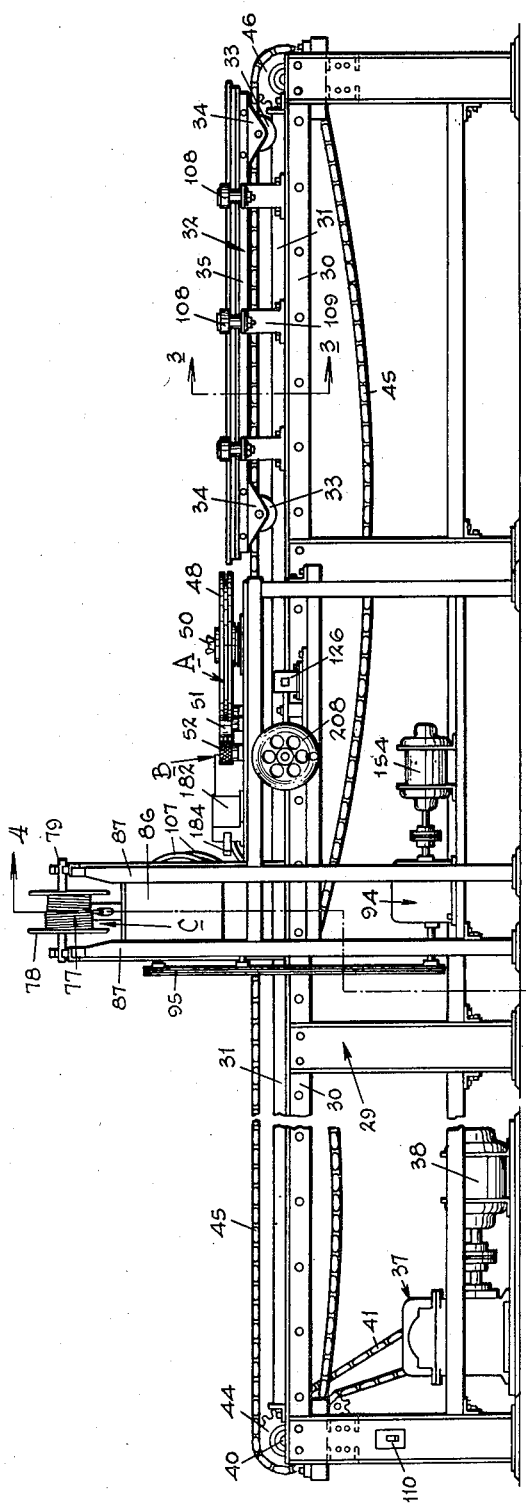
Inventor
Charles M. Browne
Nobbe & Swope
Attorneys Dec. 4, 1951 C. M. BROWNE 2,577,306
APPARATUS FOR UNITING METAL TO GLASS
Filed July 22, 1947 5 Sheets-Sheet 2
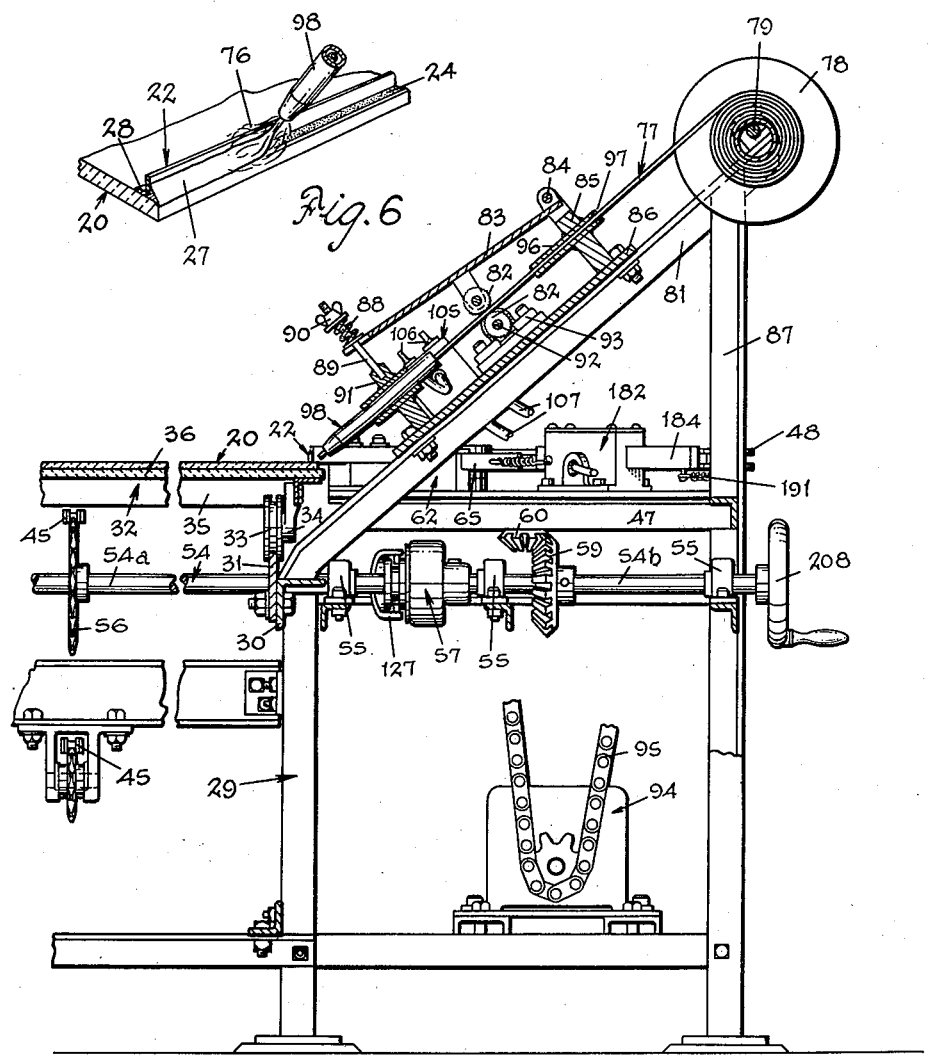
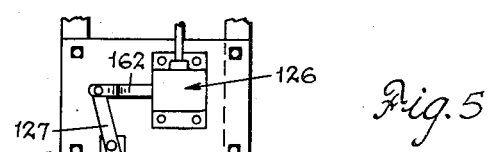
Inventor
Charles M. Browne
By Nobbe & Swope
Attorneys Dec. 4, 1951 — C. M. BROWNE — 2,577,306
APPARATUS FOR UNITING METAL TO GLASS
Filed July 22, 1947 — 5 Sheets-Sheet 3

Inventor
Charles M. Browne
By Nobbe & Swope
Attorneys

Dec. 4, 1951          C. M. BROWNE          2,577,306
APPARATUS FOR UNITING METAL TO GLASS
Filed July 22, 1947          5 Sheets-Sheet 4
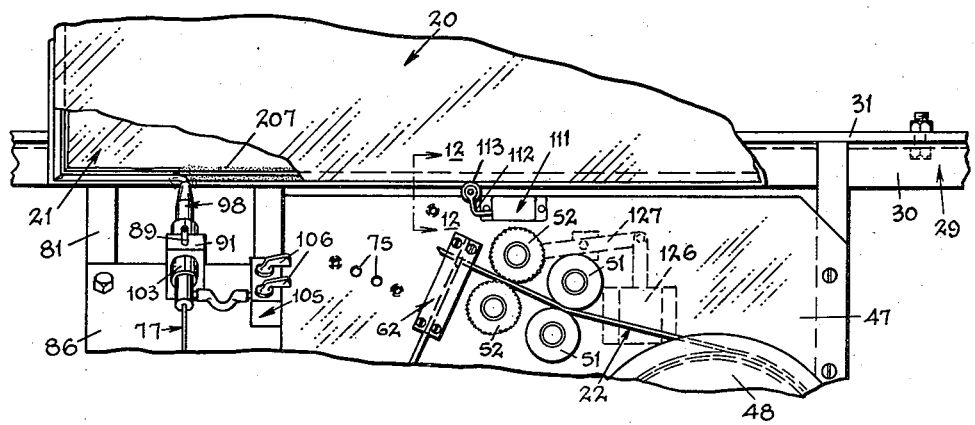
Fig. 11
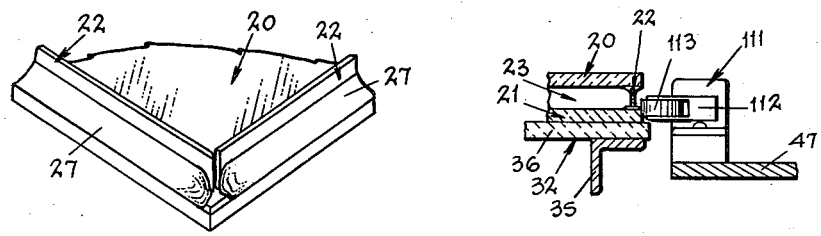
Fig. 14      Fig. 12
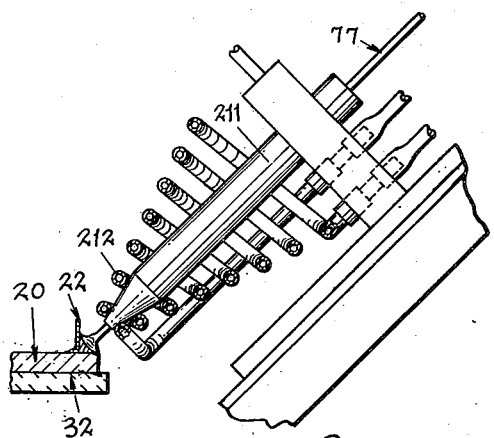      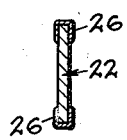
Fig. 13
Fig. 15
Inventor
Charles M. Browne
Nobbe & Swope
Attorneys Dec. 4, 1951   C. M. BROWNE   2,577,306
APPARATUS FOR UNITING METAL TO GLASS Filed July 22, 1947   5 Sheets-Sheet 5

Inventor
Charles M. Browne
By Nobbe & Swope
Attorneys

Patented Dec. 4, 1951

2,577,306

UNITED STATES PATENT OFFICE 2,577,306

APPARATUS FOR UNITING METAL TO GLASS

Charles M. Browne, Toledo, Ohio, assignor to Libbey-Owens-Ford Glass Company, Toledo, Ohio, a corporation of Ohio Application July 22, 1947, Serial No. 762,609

8 Claims. (Cl. 113—59)

This invention relates broadly to an improved method and apparatus for uniting metal to glass and more particularly to the securing of strips of metal to sheets of glass.

The invention is especially concerned with the production of hermetically sealed multi-ply glass sheet glazing units comprising two or more sheets of glass spaced apart by metallic separator means bonded to the glass sheets around the marginal portions thereof through the intermediary of a metallic coating or coatings to form an all glass-metal structure of the type shown in the patent to Haven, et al., No. 2,235,681, March 18, 1941.

In the assembling of such a unit, the metallic separator means, consisting preferably of a strip of lead tape, is soldered to the metallic coatings on the glass sheets. This soldering operation has heretofore been performed manually with suitable soldering tools in such a way as to produce fillets on both sides of the separator strip at the juncture thereof with the glass sheets to give a balanced type of joint capable of standing strain and stresses in both directions laterally of the separator strip. Unless care is observed in the soldering operation, the resulting fillets may be of rough appearance and of unequal deposition. The deposition of the solder is of considerable concern to those engaged in the assembling of this type of unit, since both the appearance as well as the permanency thereof depends largely upon the efficiency and thoroughness of the soldering operation.

An important object of the invention is the provision of a method and apparatus whereby the soldering of the separator strips to the metallic coatings on the glass sheets is automatically and continuously performed upon relative movement between the glass and solder applying means.

Another object of the invention is the provision of a method and apparatus wherein the metallic separator strip is first assembled with the glass sheet and said sheet and strip then moved into an area in which molten solder is applied in a continuous stream as the said sheet and strip move forwardly to bond the strip to the glass.

Another object of the invention is the provision of apparatus embodying means for automatically feeding the separator strip into assembled relation with the glass sheet as said sheet moves toward the soldering area and for automatically severing the strip from its supply in a measured quantity in advance of the completion of the glass travel.

A further object of the invention is the provision of apparatus including means controlled by movement of the glass sheet for initiating the feeding of the solder in wire form to the "flow" zone at a predetermined speed properly related to the rate of glass travel.

A further object of the invention is the provision of apparatus including means actuated by movement of the glass sheet to automatically control in proper sequence the feeding of the metal tape into assembly with the glass sheet, the commencement of the soldering operation, the severing of a predetermined length of tape from its source of supply, and finally the stopping of the soldering operation.

A still further object of the invention is the provision of apparatus including manually controlled means to render the tape feeding and severing means inoperative while permitting continued operation of the solder applying means.

Other objects and advantages of the invention will become more apparent during the course of the following description, when taken in connection with the accompanying drawings.

In the drawings, wherein like numerals are employed to designate like parts throughout the same:

Fig. 1 is a side elevation of apparatus constructed in accordance with the invention;

Fig. 2 is an end view thereof;

Fig. 3 is a detail section taken substantially on line 3—3 of Fig. 1 showing the rolls for locating the sheet of glass on the conveyor table;

Fig. 4 is a vertical transverse section taken substantially on line 4—4 of Fig. 1;

Fig. 5 is a plan view of a portion of the tape feeding drive means;

Fig. 6 is a perspective view illustrating the application of the separator tape to the glass sheet and the flow of solder to secure the tape thereto;

Fig. 11 is a plan view of a portion of the apparatus, certain of the parts having been removed for the completion of soldering in the formation of a double glazed unit;

Fig. 12 is a section taken substantially on line 12—12 of Fig. 11;

Fig. 13 is a sectional view of the separator tape;

Fig. 14 is a perspective view of the corner of a glass sheet showing the separator tape soldered along two sides thereof;

Fig. 15 is a view of a modified form of soldering unit;

Figure 17:
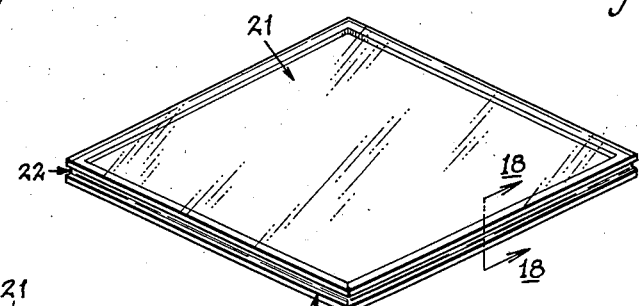
Fig. 17 is a perspective view of a double glazing unit constructed in accordance with the method and apparatus of this invention.
Figure 18:
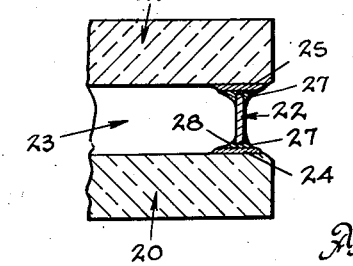
Fig. 18 is a section taken substantially on line 18—18 of Fig. 17.

With reference now to the drawings and particularly to Figs. 17 and 18, there is disclosed the type of multiple glass sheet glazing unit produced by the improved method and apparatus herein provided, and comprising generally the two sheets of glass 20 and 21 held in spaced parallel relationship to one another by a separator 22 extending entirely around the margins of the unit and providing an enclosed air space 23 within the unit. The separator consists preferably of a strip of lead tape of a thickness between $\frac{1}{32}$ and $\frac{1}{64}$ of an inch, which is joined to the glass sheets through the intermediary of the metallic coatings 24 and 25, the separator strips being preferably arranged inwardly of the edges of the glass sheets and substantially centrally of the metallic coatings.

It will be readily appreciated that two or more sheets of glass can be fabricated into a glazing unit of this character, giving one or more spaces between adjacent glass sheets as occasion may require. For example, in ordinary buildings, a two sheet unit is satisfactory, while in refrigerators and such places it is desirable as a rule to make use of three or more sheet constructions. It will thus be understood that this invention is in no way confined to the exact number of glass sheets used or spaces between the sheets.

In view of the fact that the inner surfaces of the glass sheets cannot be cleaned after the unit is made and installed, it is preferable to use glass which is stable when in use. Likewise, before the unit is completed, the inner surfaces of the glass sheets should be thoroughly cleaned not only for sake of appearance and permanency of unit, but also to facilitate application of the metal coatings upon the glass in a manner to get permanent and adequate adhesion or bond between the glass and metal.

Prior to assembly of the separator strip with the glass sheets, the marginal portions of the sheets are provided with a thin but tightly adhering coating of metal which is then treated with a suitable fluxing agent and tinned with solder to provide the metallic coatings 24 and 25. Various metals can be used for the purpose and may be applied in any suitable manner. However, the best results to date have been had with a copper-titanium-chromium alloy sprayed onto the glass in the manner described in the Haven et al. Patent 2,235,681.

Also, before assembly of the separator and glass sheets, the separator tape 22 is provided with layers of solder 26 along its opposite edges, as illustrated in Fig. 13. This too can be done in any of the generally accepted ways in which metal is tinned and it is preferred to use a special type of low melting point solder for the heat and pressure method of compositing. One very good solder is made up of 50 parts of lead, 30 parts of bismuth and 20 parts of tin. This solder has a melting point of around 111° centigrade.

The separator strips 22 are then arranged inwardly of the outer edges of a sheet of glass approximately centrally of the metallic coatings 24 and 25 thereon. An electric iron or other heating means is then ordinarily employed to elevate the temperature of the solder coatings on the separator strip and glass to induce flowing of the solder, and simultaneously additional solder is added to produce a fillet 27 on one side of the separator strip and a second smaller fillet 28 on the opposite side of said strip whereby the separator strip is firmly bonded to the glass sheet. This type of unit and method employed in the fabrication thereof is illustrated and described in Patent 2,235,681, supra. While the procedure described in said patent has produced a thoroughly satisfactory type of unit, it is an aim of this invention to provide a method and apparatus whereby manual assembly of the separator strip with the glass sheets and the subsequent manual soldering operation can be eliminated or at least reduced to a minimum. Accordingly, the invention contemplates the provision of a method and apparatus whereby lead tape forming the separator can be properly associated with the glass sheet and maintained in such position during the soldering operation and until the cooling solder permanently affixes it in position, with a sufficient fillet of solder to bring about the desired and necessary seal between the metallized surfaces of the glass and the tape. This requires not only uniform feeding of the tape but an equally uniform rate of feed for the solder which is delivered to the "flow" point in wire form so that it flows freely in a continuous stream to produce a smooth, dense fillet. Accordingly, the rate of speed for both the lead tape and the solder wire is preferably synchronized with the speed of travel of the glass sheet as it passes through the working zone.

As illustrated in Fig. 1, the several operating units of the machine are mounted on a main frame 29 which includes the spaced parallel, longitudinally extending angle irons 30 to which a pair of rails 31 are suitably secured. The rails 31 extend the length of the frame 29 and mounted thereon is a conveyor table 32 provided with grooved wheels 33 which roll along said rails. The wheels 33 are journalled in brackets 34 secured to the frame 35 of the table 32. The upper glass supporting surface 36 of the table is preferably formed of a suitable fireproof material to protect the table during the soldering operation while furnishing a suitably rigid mount for the glass during the assembling operations.

The rate of movement of the conveyor table 32 on the rails 31 is controlled by a speed reduction unit 37 driven by a motor 38. The motor 38 is preferably of a conventional reversible type so that the table, upon reaching the end of its travel in one direction, may be returned to its starting position. A sprocket wheel 39, mounted on a horizontal shaft 40, is coupled to the reduction unit 37 by a sprocket chain 41. The shaft 40 extends transversely of the frame 29 and is journalled in spaced bearings 42 mounted on the cross web 43 of said frame.

A second sprocket wheel 44, mounted on shaft 40, has trained thereabout a sprocket chain 45, said chain being trained at the opposite end of the frame 29 about an idler sprocket 46 carried by the said frame. The sprocket chain 45 is suitably attached to the frame 35 of the conveyor table 32 so as to effect movement thereof back and forth between the opposite ends of the frame 29 upon periodic reversal of the drive motor 38.

Figure 7:
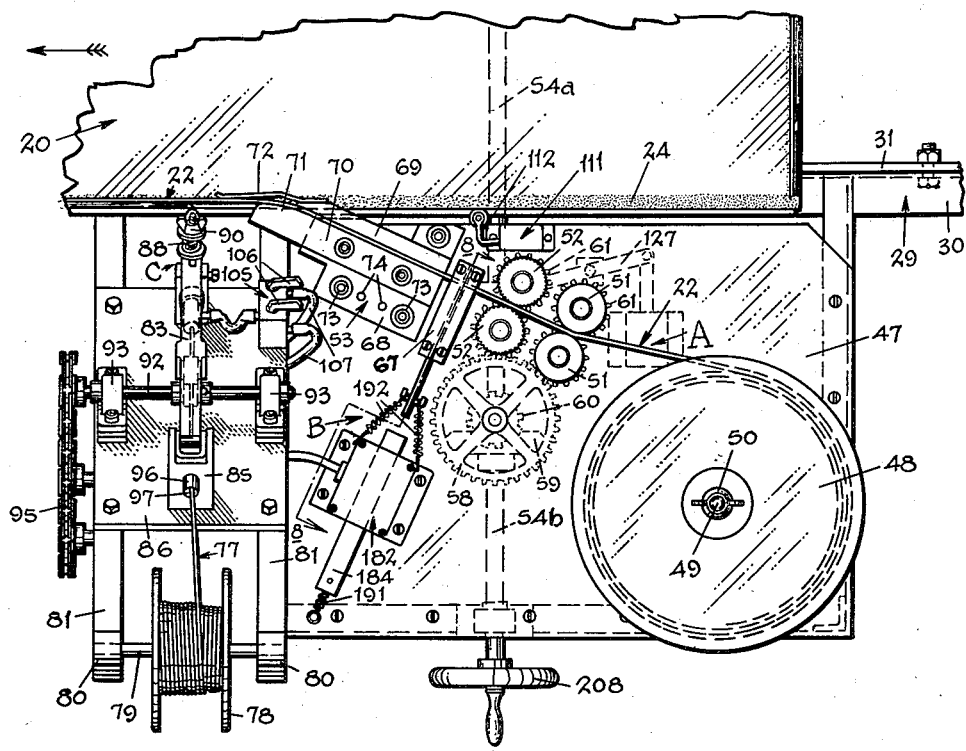
Fig. 7 is a plan view of the tape feeding and severing means and soldering unit.
Figure 8:
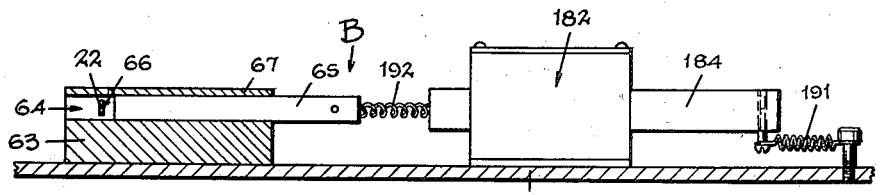
Fig. 8 is a section taken substantially on line 8—8 of Fig. 7 showing the tape severing unit.

Mounted upon a horizontal shelf 47 arranged at one side of the frame 29 intermediate the ends thereof is the tape feeding means A, tape severing means B, and soldering unit C. The tape feeding means A comprises a reel 48 on which the tape 22 is wound, said reel being carried upon a vertical stub shaft 49 carried by the horizontal shelf 47. Threaded upon the upper end of the shaft 49 is a wing nut 50 to prevent rising of the reel 48 as it is rotated to withdraw the tape 22 therefrom. The tape is withdrawn from the reel and directed to the edge of the glass sheet by the two pairs of feed rollers 51 and 52 and a guiding channel member 53 also carried by the horizontal shelf 47. The feed rollers 51 and 52 may have knurled peripheral surfaces or, as shown in Fig. 7, a pair of plain surfaced rollers 51 may be employed to straighten the tape 22 as it is drawn from the reel by the pair of rollers 52 having knurled surfaces. The rotation of the rollers 51 and 52 is governed by the speed of movement of the sprocket chain 45 which is attached to the underside of the conveyor table 32 in the following manner.

Extending transversely of the frame 29 is a shaft 54 journalled in spaced bearings 55 and having keyed thereto a sprocket wheel 56 engageable by the sprocket chain 45. The shaft 54 is formed of two aligned sections 54a and 54b interconnected by a conventional form of friction clutch 57. When the coacting parts of the clutch 57 are engaged, the shaft sections 54a and 54b rotate in unison to drive a horizontal spur gear 58 through the bevel gears 59 and 60, gear 59 being mounted on section 54b of shaft 54 while gear 60 is commonly mounted with spur gear 58. The spur gear 58 meshes with and drives a plurality of pinions 61 that are keyed to the supporting shafts of the pairs of feed rollers 51 and 52. By suitable arrangement of the gears comprising the gear train, the speed of rotation of the rollers 51 and 52 will be governed by the movement of the table since it is a necessary requisite that the separator tape be regularly fed to the glass sheet as said sheet is moved forwardly.

The tape 22 is thus fed from the reel 48, passing between the pairs of rollers 51 and 52, to the guiding channel member 53. Interposed between the feed rollers and guiding channel member is the severing means B for cutting the tape into predetermined lengths, said severing means comprising a base block 63 provided with a longitudinally extending slot 64 in which a knife blade 65 is slidably mounted, while the tape 22 moves through a transverse slot 66 in the walls of the slot 64. A cover plate 67 may be secured to the base block to close the slots to form longitudinal and transverse passageways through the base.

The guide member 53 comprises a base 68 having an upstanding wall 69 to which is opposed an adjustably mounted block 70 forming with said wall a channel for the tape 22. The block 70 is preferably mounted for movement toward and away from the wall 69 to accommodate tapes of different thicknesses. The outer end of the guide block 70 is curved as at 71 to direct the tape into the desired position on the glass. The curved surface 71 of block 70 also provides a metering surface so that the tape position will always be properly maintained with reference to the edge of the glass sheet. To retain the tape in desired position on the glass and particularly during initial assembly and before any solder has been deposited, a flexible finger 72 may be secured to the base 68 to extend forwardly some distance beyond the outer end 71 of the block 70.

The base 68 of guide member 53 is removably secured to the shelf 47 by bolts or the like 73 and has locating pins 74 which are received within openings 75 (Fig. 11) in the shelf. The guide member 53 may thus be removed during desired periods of the process and replaced without departure from an established position. As will be later described, the guide member 53 must be removed when completing the assembly of a double glazed unit such as when the soldering of the separator strip to the second sheet of glass is being performed.

As shown in Fig. 6 of the drawings, the bonding of the separator tape 22 to the glass sheet 20 is effected by a continuous flow of solder under the influence of a directed flame as indicated generally at 76. The flame is preferably produced from a mixture of hydrogen and oxygen gases, the proportions of the combination being such as to afford a reducing area in which the solder is caused to melt. The continuous movement of the glass prevents puddling or irregular deposition of the solder so that the joint throughout its length is a smooth and solid fillet, as indicated at 27. Due to the presence of a uniform heat medium, a thorough bonded relation is established between the solder coats on the metallized area of the glass sheet and the tape, while the entire area of the coated areas on the other side of the tape is effected by the heat to form a small fillet 28. Momentarily, therefore, in the critical heating zone, the proximate tape edge is held in molten solder and as the glass moves the cooling solder sets up a permanently tight seal or joint.

As best shown in Figs. 4 and 7 of the drawings, the solder is supplied to the point or area of flow in wire form 77 from a spool 78 supported on a horizontal rod 79. The rod 79 is loosely mounted in forked blocks 80 which are carried at the upper ends of inclined framing angles 81 forming a part of the frame 29 for quick substitution of a fresh spool when the solder wire on one spool has been exhausted. The angles 81 are supported at their lower ends on the channels 30 and rise at an angle therefrom to their outer supporting legs 87. The solder wire 77 is drawn from the spool 78 by a pair of knurled rollers 82.

The upper roller 82 is supported on an arm 83 pivotally mounted at one end at 84 in a yoke formed in the top of the block 85. The block 85 is secured to a supporting plate 86 mounted upon the framing angles 81.

The angles 81 and plate 86 are disposed at predetermined angles to present the solder to the glass for the best deposition in its flowing condition. The upper roller 82 is urged against the solder wire 77 and lower roller by a spring 88 which is positioned on a rod 89 between the free end of the arm 83 and a wing nut 90. The rod 89 is secured in a block 91 mounted on the plate 86. The lower roller 82 is mounted on a shaft 92 journalled in bearings 93 on the plate 86. The shaft 92 is driven from a speed reduction unit 94, the driving connection being through the sprocket chain 95 and suitable sprockets keyed to the respective shafts. The reduction unit 94 is preferably of the motor-driven, hydraulically variable speed type to provide a convenient mode of control for feeding the solder wire, although equivalent speed control units may be substituted therefore.

Figure 9:
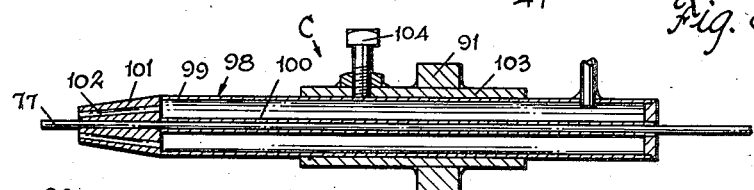
Fig. 9 is a longitudinal sectional view through the soldering unit.
Figure 10:
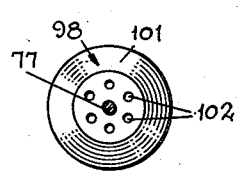
Fig. 10 is an end view of the soldering unit.

As the solder wire 77 is drawn from the spool 78, it passes through a straightening tube 96 located in the block 85 and having a cone shaped mouth 97 for freely receiving the wire as it is progressively drawn from the spool. The wire is fed between the rollers 82 into a gas delivery unit or burner tube 98. The unit 98 comprises a tube 99 which is provided axially thereof with a sleve 100 (Fig. 9) which extends from one end to the burner head 101 at the other end. The head 101 is provided with gas ports 102 surrounding the outlet of the sleeve 100 so that the wire 77 emerges centrally into the flame. The tube 99 forming the exterior jacket of the burner unit 98 is adjustably secured in a sleeve 103, supported in the block 91, by a set screw 104. The burner tube 99 is connected to a mixing chamber 105 mounted on the plate 86 and which is provided with valves 106 for controlling the flow of the hydrogen and oxygen gases to produce the most efficient mixture. The chamber 105 may be connected to suitable sources of supply by flexible hoses 107.

Having placed a sheet of glass upon the table 32, it is located thereupon by the positioning of one edge against a series of aligning rolls 108 freely rotatable in brackets 199 attached to the channels 30 of the frame 29. The mixing chamber 105 is then adjusted to produce the most efficient flame when the gases are ignited at the burner head 102. A control switch 110, when closed, completes a circuit to the motor 38 whereby the reduction unit 37 causes the sprocket chain 41 to drive the sprocket wheel 39 and in turn the sprocket wheel 44 and sprocket chain 45. The conveyor table 32 now approaches the guide member 53 and contacts a limit switch 111.

Figure 16:
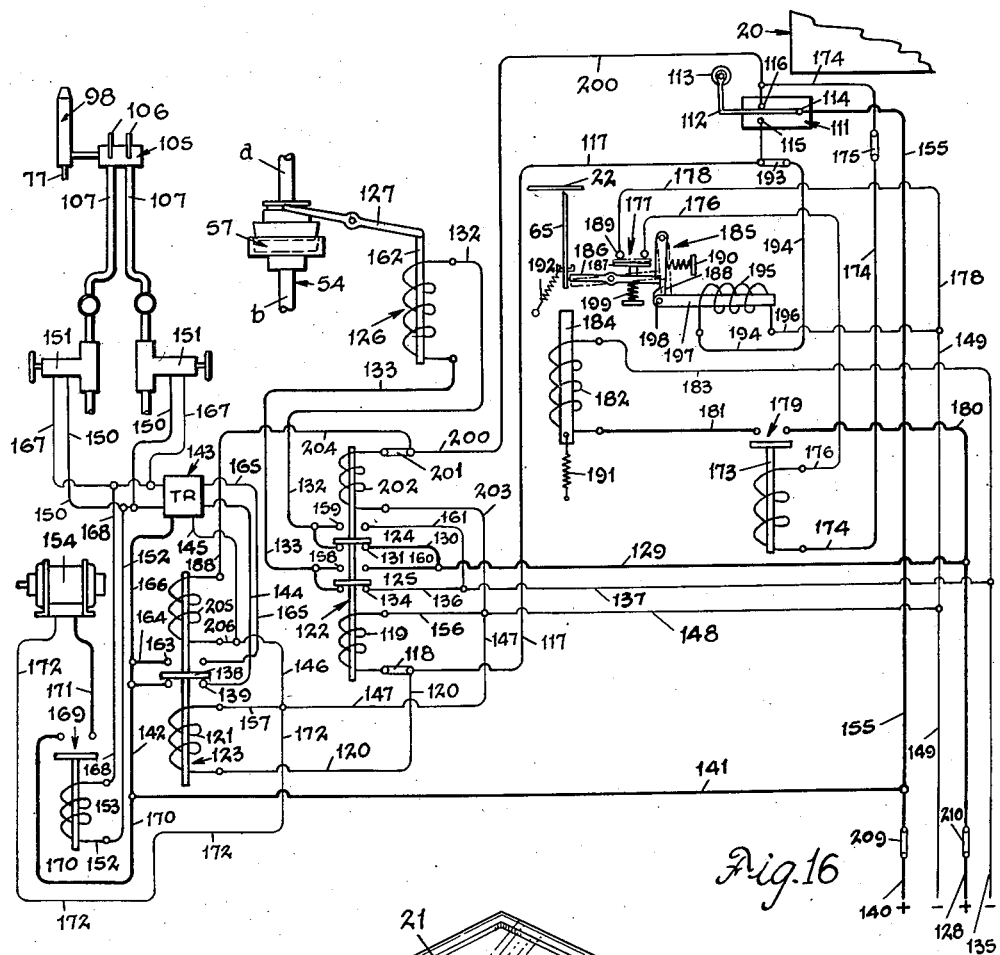
Fig. 16 is an electrical wiring diagram showing the operation of the various elements of the apparatus.

The limit switch 111 has a switch arm 112 provided with a roller 113 which contacts the edge of the glass sheet and maintains a rolling contact therewith (Fig. 12). The mounting post 114 for the switch arm 112 constitutes one of the binding posts of the switch 111 (Fig. 16). The switch 111 is designed to initiate and terminate the soldering operation without specific setting for varying length of sheet. Preferably the switch is so located with respect to the burner unit 98 that movement of the arm 112 in one direction to engage the contact 115 will be effected by engagement with the glass edge, at the leading corner thereof and at a distance from the burner unit equal to the length of tape 22 required to extend from the severing means 62 to the burner. Likewise, when the following corner of the glass sheet has reached the roller 113 of the arm 112, there will be sufficient tape in the channel of the guide member 53 to complete the operation in the vicinity of the following corner. As the switch arm 112 is released from the contacting pressure of the glass, it returns to a normal position of rest and establishes a circuit from the post 114 to the contact 116 (Fig. 16).

In order to accomplish the above described functions automatically and to afford a control which is adaptable to any length of glass sheet, an electric system has been developed to cause operation of the various units (the tape feed, the solder feed, and the burner unit), in sequential order, and in subsequent cessation of operation. Thus, the contacts 115 and 116 of the switch 111 establish in the order of their closure with the arm 112, either the starting or stopping phases of the operation. The contact 115 is connected by a line 117 and a manually operated switch 118 to the coil 119 and by a branch line 120 to the coil 121 of the double action relay switches 122 and 123 respectively.

The armature of the relay switch 122 carries two contact bars 124 and 125 which control the energization of a coil 126, the armature of which is pivotally connected to one end of a pivoted level 127, the opposite end of the lever being connected to the friction clutch 57. According to the movement of the armature of switch 122, the lever 127 will be actuated to open or close the parts of the friction clutch 57.

Prior to engagement of the glass sheet with the arm 112 of switch 111, the armature of switch 122 will be located as shown in Fig. 16, and the contact bars 124 and 125 will complete a circuit from a source of direct current electric energy 128 by the lines 129 and 130, the fixed contacts 131, the bar 124 and line 132 to the coil 126, the line 133, bar 125 and fixed contacts 134 to the return line 135 by the lines 136 and 137. The armature of the coil 126 will thus be influenced to retain the clutch 57 open and prevent operation of the tape feeding mechanism. Also, the armature of the relay switch 123 will be positioned so that the contact bar 138 thereof will engage a pair of fixed contacts 139. The contacts 138 and 139 complete a circuit from source of alternating current 140 entering lines 141 and 142, to a reversing timing relay 143 by a line 144, and by the lines 145, 146, 147 and 148 from the relay to the return 149 of the supply circuit. The timing relay is of a conventional reversing type which may be periodically operated to close a control circuit and, upon later operation, to subsequently open the control circuit. As herein provided, the relay 143 produces a control for operation of the burner unit and solder feeding mechanism and is adjusted to create a time interval equal to the period of time required for the leading corner, or the rear corner, of the glass sheet to progress from the switch 11 to the vicinity of the burner unit 98. The control circuit emanating from the relay 143 extends by a line 150 to a pair of solenoid operated valves 151 and by a line 152 to the coil of a relay switch 153 that controls the power circuit of a motor 154 for operating the reduction unit 94 that drives the solder feed. The valves 151 are located in the supply hoses 107 and, when operated, increase or reduce the flow of hydrogen and oxygen to the mixing chamber 105. Preferably, the valve controlling the hydrogen supply is adjusted to permit a minimum flow of the gas to the chamber 105 and burner unit 98 for maintaining a pilot flame.

Thus, when the forward edge of the glass sheet 20 contacts the roller 113 of switch arm 112 and depresses the arm, a circuit will be completed from the A. C. supply line 140 by the line 155 through the post 114, arm 112 and contact 115, the lines 117 and 120 to the coils 119 and 121. The coils 119 and 121 are connected to the return side 149 of the A. C. supply circuit by the line 156 and the lines 157, 147 and 148 respectively. The coil 119, when energized, moves the bar contacts 124 and 125 to open the circuits through the contacts 131 and 134 and to make circuits through the fixed contacts 158 and 159. The contacts 158 and 159 cause a reversal of operating influence of the coil 126 since the line 133 is now connected to the D. C. power line 128 by the lines 160 and 129, and the line 132 is connected to the return line 135 by the lines 161 and 137. The reversal of flow of electrical energy through the coil 126 causes the expulsion of the armature 162 with consequent rotation of the lever 127 to close the halves of the clutch 57 into engaging relation. The tape 22 is now fed into the channel of the guide member 53 and toward the glass by means of the feed rollers 51 and 52. In a similar manner, the coil 121 of the switch 123 has caused closure of the bar contact 138 with the fixed contacts 163 to establish a circuit from the line 142 by the line 164 to the line 165 and the control circuit of the reversing timing relay 143. The relay, when inactive following the set time interval, permits completion of the circuits from the power supply line 140 by the lines 141, 142 and 166 through the relay to the solenoid operated valves 151 by the line 150 and to the coil of the relay switch 153 by the line 152. The valves are connected through the relay to the return line 145 by the line 167, while the coil of the switch 153 is completed to the line 167 by a line 168. When actuated by the circuits through the timing relay 143, the valves 151 are fully opened to the mixing chamber 105. If desired, suitable flow gauges may be placed in the hoses for inspection purposes.

When the coil of the relay switch 153 is also energized, the contacts 169 of the switch complete the circuit to the motor 154 of the reduction unit 94 from the A. C. power source line 140 by the lines 141 and 170, the contacts 169 and line 171, and to the return 149 by the line 172 and branch return line 147. The unit thereupon causes rotation of the shaft 92 and the rollers 82 to feed the solder wire 77 into the burner unit 98. The soldering operation will thus be initiated and will continue as the glass sheet and lead tape are moved into the soldering area.

As the rear edge of the glass sheet 20 passes beyond the roller 113 of switch 111, the tape 22 will be automatically cut by the severing means 62 and further feeding from its supply reel will be halted. The length of tape in the guide member 53 will be of the length required along the side of the glass. The tape severing means is actuated by the completion of a circuit to cause actuation of the knife blade. The circuit is completed from the source of energy and the main A. C. positive line 140 and line 155 through the switch post 114, arm 112, and contact 116, to a solenoid operated switch 173 through line 174 in which is interposed a manually operated switch 175. Leading from the coil of the switch 173 is a line 176 connected to a switch 177 which is in turn connected with the negative line 149 through the line 178 to complete the circuit. Energization of the coil of switch 173 will effect the closing of a switch 179 to complete a circuit by the line 180 from the direct current supply line 128 and line 181 to a coil 182, while leading from the coil is a negative line 183 to the D. C. return 135. When the coil 182 is energized, the armature 184 thereof is forced outwardly to exert an impact upon the knife blade 65 of the severing means 62 to momentarily force the blade forwardly to cut the metal tape. However, the influence of the coil 182 can only be of momentary duration since the knife blade must be immediately retracted. The forward movement of the armature 184 is therefore also utilized to break the circuit through the switch 177 to deenerize the coil of switch 173. Simultaneous with the opening of switch 177, the armature 184 operates a resetting device 185 for holding the switch 177 open until the cut-off knife is again to be operated. This resetting or holding device comprises a pivoted lever 186 carrying the movable contact 187 of switch 177 and a pivoted latch 188 engaging the adjacent end of lever 186 to maintain the movable contact 187 of switch 177 out of engagement with the stationary contacts 189. Thus, when the armature 184 is projected forwardly, it not only actuates the cut-off knife 65 but also engages lever 186 to swing it about its pivot and move the movable contact away from the fixed contacts. The latch 188 is urged forwardly by a spring 190 to automatically engage the lever and maintain the switch open. The armature 184 will be returned by a spring 191, allowing the springs 192 to retract the knife blade 65.

The switch 177 will be subsequently closed when the switch arm 112 is moved into engagement with contact 115. The line 117 is connected through the hand switch 193 to a line 194 running to a coil 195, while leading from the coil to the return line 141 is a wire 196. The armature 197 of the coil is pivotally connected, as at 198, to the latch 188 and upon energization of the coil the armature will be pulled inwardly to disengage the latch 188 from lever 186, thereby permitting the spring 199 to close the switch 177. However, since the line 174 to the switch 173 is open at the contact 116, the circuit to the coil 182 will not be effected so that the switch 177 will be maintained closed until the glass sheet passes out of contact with roller 113, whereupon the above cycle of operations will be repeated to close switch 179 and energize coil 182 to operate the tape severing means.

Since feeding of the tape must be interrupted when the knife 65 is actuated, the relay switch 122 must be reversed to complete a circuit through the coil 126 whereby to effect energization thereof to disengage the clutch 57 which will stop the rotation of the section b of shaft 54 which drives the tape feeding means. To accomplish this, a circuit is made from the A. C. supply line 140 and line 155 and contact 116 through the line 200 and hand switch 201 to the coil 202 of relay switch 122 and from the coil through the lines 203 and 148 to the negative main line 149. The coil 202, which is opposite the coil 119, causes movement of the bar contacts 124 and 125 away from the fixed contacts 158 and 159 into engagement with contacts 131 and 134. Upon engagement with the contacts 131 and 134, a circuit will be established from the D. C. supply line 128 to the line 132 and coil 126, the return being made through the line 133, contacts 125 and 134 and lines 136 and 137 to the negative main line 135. Reversing the field through the coil 126 causes the lever 127 to shift the halves of the clutch 57 so that the driving portion 54b of the shaft is separated from the driven portion 54a.

Leading from the switch 201 is a line 204 connected to a coil 205 of the relay switch 123, while running from the coil to the branch return lines 146 and 147 is a line 206. The coil 205, when energized, induces opening of the contacts 138 and 163 and closes contacts 138 and 139 to reset the timing relay 143. During the operation of the relay, the valves 151 will remain open and the solder feed continued by the motor 154. The predetermined period of operation of the relay allows completion of the soldering of the length of tape to the glass sheet. The operating period of the time relay is equal to the distance from the switch 111 to the burner unit 98. When the end of the tape is reached, the solder feed will be stopped and the flame of the burner unit 98 diminished to merely a pilot flame of hydrogen gas.

Successive passing of the glass sheet through the machine with another edge in position for soldering will complete the securing of the separator strip along all four edges of the sheet. As shown in Fig. 14, the separator strip is secured along two edges of the glass sheet, and it will be noted that the fillets 27 terminate substantially at the corner of the sheet. Joining of the ends of the separator strips and likewise joining of the ends of the fillets is preferably accomplished by a hand soldering operation.

When the corners have been sealed, the glass sheet is ready for assembly with a second sheet of glass 21 into a double glazed unit as shown in Figs. 17 and 18. In preparation for the securing of the separator to the second sheet of glass, the guide member 53 is removed and the switches 118, 175, 193 and 201 are manually opened to render parts of the electric system inoperative. As shown in Fig. 16, the switch 175 is located in the line 174 to render the coil of the switch 173 inoperative; the switch 193 in the line 194 to similarly render the coil 195 inoperative; and the switches 118 and 201 in the lines of the coils 119 and 202 of the relay switch 122 render the coils inoperative. The portion of the automatic control system which effects the tape feed and the tape cut-off will accordingly be removed, temporarily, from operation by the switch 111. Thus, when the conveyor 32 is drawn toward the burner unit 98 and the leading corner of the glass sheet 21 contacts the arm 112, closure of the circuit from the post 114 to the contact 115 will be again established and, through the line 120, the coil 121 of the relay switch 123 will be energized to complete the necessary circuits for functioning of the timing relay 143 and subsequently the solenoid valves 151 and the motor 154 of the reduction drive unit.

The union of the tape 22 to the glass sheet 21 will thus be produced by the flowing solder, the fillet bonding the remaining edge of the tape 22 to the tinned area 207 of the sheet 21. The procedure is again followed with the three remaining sides and the resulting unit will appear as shown in Fig. 17. Following the sealing of the corners, the strip is suitably pierced and the interior of the unit is processed for dehydration of the air space, introduction of a proper gas, or evacuation of said air space. Fig. 18 illustrates a cross-sectional view taken through an edge of the completed unit 22 to show the seal established by the fillets 27 with respect to the tape and the glass sheets 20 and 21.

In order to manually feed the tape from the reel 48, as in the case of a replacement, a hand wheel 208 is keyed to the free end b of the shaft 54 so that the bevel gears may be driven to operate the pairs of rollers 55 and 56 until the end of the tape 22 is fed through the severing means 62.

Upon completion of the glass travel past the unit 110, the switches 209 and 210 may be operated to open the supply lines 128 and 149 pending return of the conveyor 32 to its starting position when they may again be closed to place the electric system in operation.

As shown in Fig. 15, a modified form of heating may be substituted for the hydrogen and oxygen burning unit 98. In the figure, the solder wire is fed through a ceramic sleeve 211 which is surrounded by a focusing high frequency coil 212. The coil is preferably conical in form to concentrate the effective heat upon the solder issuing from the sleeve in position for deposition onto the glass and tape. The coil 212 may be formed of hollow tubing which is connected to a suitable water supply for cooling, and the electrical energy, or control therefor, may be substituted in a modified electric system to assure performance of the coil in a manner similar to the burner unit 98.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for uniting a strip of metal to a sheet of glass, means for supporting the glass sheet and for carrying it forwardly, means for withdrawing a strip of metal from a source of supply and progressively placing it on the glass sheet as said sheet moves forwardly, means for directing a body of solder to the line of juncture of the metal strip and glass sheet during continued forward movement of said sheet and strip, solder melting means adjacent said line of juncture and surrounding the path of travel of said body, and means located between the path of travel of said sheet of glass and the source of supply for said strip of metal and operable when said sheet reaches a predetermined point in its forward movement to cut a metal strip of predetermined length from its source of supply.

2. In apparatus for uniting a strip of metal to a sheet of glass, means for supporting the glass sheet and for carrying it forwardly, means for progressively feeding a strip of metal to and locating it on the glass sheet inwardly of the edge thereof as said sheet moves forwardly, means for continuously directing a body of solder to the line of juncture of the metal strip and glass sheet during continued forward movement of said sheet and strip, solder melting means adjacent said line of juncture and surrounding the path of travel of said body, and means positioned in the path of the glass sheet and operable by the sheet when said sheet reaches a predetermined point in its forward movement for initiating the soldering operation.

3. In apparatus for uniting a strip of metal to a sheet of glass, means for supporting the glass sheet and for carrying it forwardly, means for progressively feeding a strip of metal to and locating it on the glass sheet inwardly of the edge thereof as said sheet moves forwardly, means for continuously directing a body of solder to the line of juncture of the metal strip and glass sheet during continued forward movement of said sheet and strip, solder melting means adjacent said line of juncture and surrounding the path of travel of said body, and means positioned in the path of the glass sheet and actuated thereby for starting and subsequently stopping the soldering operation.

4. In apparatus for uniting a strip of metal to a sheet of glass, means for supporting the glass sheet and for carrying it forwardly, means for withdrawing a strip of metal from a source of supply and progressively placing it on the glass sheet as said sheet moves forwardly, means for directing a body of solder to the line of juncture of the metal strip and glass sheet during continued forward movement of said sheet and strip, solder melting means adjacent said line of juncture and surrounding the path of travel of said body, means located between the path of travel of said sheet of glass and the source of supply for said strip of metal and operable when said sheet reaches a predetermined point in its forward movement to cut a metal strip of predetermined length from its source of supply, and means controlled by movement of the glass sheet for initiating the soldering operation.

5. In apparatus for uniting a strip of metal to a sheet of glass, means for supporting the glass sheet and for carrying it forwardly, means for withdrawing a strip of metal from a source of supply and progressively placing it on the glass sheet as said sheet moves forwardly, means for directing a body of solder to the line of juncture of the metal strip and glass sheet during continued forward movement of said sheet and strip, solder melting means adjacent said line of juncture and surrounding the path of travel of said body, means located between the path of travel of said sheet of glass and the source of supply for said strip of metal and operable when said sheet reaches a predetermined point in its forward movement to cut a metal strip of predetermined length from its source of supply, and means controlled by movement of the glass sheet for starting and subsequently stopping the soldering operation.

6. In apparatus for uniting a strip of metal to a sheet of glass, conveyor means for supporting a glass sheet, means for driving said conveyor means to carry the glass sheet forwardly, means driven from the conveyor drive means for withdrawing the metal strip from a source of supply and progressively feeding it into assembled relation with the glass sheet as said sheet moves forwardly, means for directing a body of solder to the line of juncture of the metal strip and glass sheet during continued forward movement of said sheet and strip, solder melting means adjacent said line of juncture and surrounding the path of travel of said body, and means located between the path of travel of said sheet of glass and the source of supply for said strip of metal and actuated by the sheet when it passes a predetermined point in its forward movement for automatically severing a strip of metal of predetermined length from its source of supply and for stopping operation of the strip feeding means while allowing continued movement of said conveyor.

7. In apparatus for uniting a strip of metal to a sheet of glass, conveyor means for supporting a glass sheet, means for driving said conveyor means to carry the glass sheet forwardly, means driven from the conveyor drive means for withdrawing the metal strip from a source of supply and progressively feeding it into assembled relation with the glass sheet as said sheet moves forwardly, means for directing a body of solder to the line of juncture of the metal strip and glass sheet during continued forward movement of said sheet and strip, solder melting means adjacent said line of juncture and surrounding the path of travel of said body, means located between the path of travel of said sheet of glass and the source of supply for said strip of metal and actuated by the sheet when it passes a predetermined point in its forward movement for automatically severing a strip of metal of predetermined length from its source of supply and for stopping operation of the strip feeding means while allowing continued movement of said conveyor, and means controlled by movement of the glass sheet for starting and subsequently stopping the soldering operation.

8. In apparatus for uniting a strip of metal to a sheet of glass, conveyor means for supporting a glass sheet in a horizontal position and for carrying it forwardly, means for driving said conveyor means, means for feeding a strip of metal from a source of supply and for progressively placing it upon the glass sheet inwardly of an edge thereof as said sheet moves forwardly, means driven from said conveyor drive for operating the strip feeding means in timed relation with the conveyor, means for directing a body of solder to the line of juncture of the metal strip and glass sheet upon continued forward movement of said sheet, solder melting means adjacent said line of juncture and surrounding the path of travel of said body, means for discontinuing the movement of said body of solder, means for cutting said strip of metal, and means located in the path of movement of the glass sheet and operable by said sheet for actuating, in proper sequence, said metal strip feeding means, said solder directing means, said strip cutting means to sever a predetermined length of metal strip from its source of supply and said means for discontinuing the movement of said body of solder.

CHARLES M. BROWNE.

REFERENCES CITED

The following references are of record in the file of this patent:

UNITED STATES PATENTS

| Number | Name | Date |
|---|---|---|
| 605,928 | Shuster | June 21, 1898 |
| 725,703 | Hanks | Apr. 21, 1903 |
| 1,223,777 | Eby | Apr. 24, 1917 |
| 1,441,094 | Jenkins | Jan. 2, 1923 |
| 1,797,795 | Ruhr | Mar. 24, 1931 |
| 1,893,093 | Linville | Jan. 3, 1933 |
| 1,938,387 | Irwine | Dec. 5, 1933 |
| 2,140,864 | Taylor | Dec. 20, 1938 |
| 2,181,135 | Kehl | Nov. 28, 1939 |
| 2,220,107 | Holloway | Nov. 5, 1940 |
| 2,235,681 | Haven | Mar. 18, 1941 |